United States Patent
Lin et al.

(10) Patent No.: US 10,080,214 B2
(45) Date of Patent: Sep. 18, 2018

(54) SIGNALING AND DECODING WITH CROSS-TRANSMISSION TIME INTERVAL (TTI) OR CROSS-CARRIER REFERENCING

(71) Applicant: QUALCOMM Incorporated, San Diego, CA (US)

(72) Inventors: Jamie Menjay Lin, San Diego, CA (US); Jing Jiang, San Diego, CA (US); Tingfang Ji, San Diego, CA (US); Kambiz Azarian Yazdi, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 15/079,923

(22) Filed: Mar. 24, 2016

(65) Prior Publication Data
US 2017/0070984 A1 Mar. 9, 2017

Related U.S. Application Data

(60) Provisional application No. 62/214,288, filed on Sep. 4, 2015.

(51) Int. Cl.
*H04W 72/04* (2009.01)
*H04L 5/00* (2006.01)
(Continued)

(52) U.S. Cl.
CPC ......... *H04W 72/0406* (2013.01); *H04L 5/001* (2013.01); *H04L 5/0048* (2013.01);
(Continued)

(58) Field of Classification Search
CPC .......... H04W 72/0406; H04W 72/0446; H04L 5/001; H04L 5/0048; H04L 5/0053;
(Continued)

(56) References Cited

U.S. PATENT DOCUMENTS

2009/0257408 A1* 10/2009 Zhang ................... H04L 1/1621
370/336
2010/0192035 A1* 7/2010 Sagfors ................. H04L 1/1819
714/748

(Continued)

FOREIGN PATENT DOCUMENTS

EP       2034757 A1     3/2009
EP       2919402 A1     9/2015
(Continued)

OTHER PUBLICATIONS

Ericsson: "2-ms E-DCH TTI Coverage Extension", 3GPP Draft; R1-091902, 3rd Generation Partnership Project (3GPP), Mobile Competence Centre ; 650, Route Des Lucioles ; F-06921 Sophia-Antipolis Cedex ; France, val. RAN WG1, No. San Francisco, US; Mar 4, 2009-Mar. 8, 2009, May 2, 2009 (May 2, 2009), XP050597456, 6 pages. [retrieved on May 2, 2009].

(Continued)

*Primary Examiner* — Oussama Roudani
(74) *Attorney, Agent, or Firm* — Patterson & Sheridan, L.L.P.

(57) ABSTRACT

Certain aspects of the present disclosure relate to method and apparatus for wireless communication. In certain aspects, the method generally includes transmitting first control information during a first transmission time interval (TTI), wherein the first control information indicates resources within a TTI allocated for a data transmission, and transmitting the data using the indicated resources. The method further includes transmitting second control information, wherein the second control information also indicates the resources for the data transmission.

22 Claims, 13 Drawing Sheets

(51) Int. Cl.
*H04L 1/08* (2006.01)
*H04L 1/18* (2006.01)

(52) U.S. Cl.
CPC .......... *H04L 5/0053* (2013.01); *H04L 5/0094* (2013.01); *H04W 72/0446* (2013.01); *H04L 1/08* (2013.01); *H04L 1/189* (2013.01); *H04L 1/1812* (2013.01); *H04L 5/005* (2013.01); *H04L 5/006* (2013.01)

(58) Field of Classification Search
CPC ....... H04L 5/0094; H04L 1/08; H04L 1/1812; H04L 1/189; H04L 5/005; H04L 5/006
See application file for complete search history.

(56) References Cited

U.S. PATENT DOCUMENTS

| | | | | |
|---|---|---|---|---|
| 2013/0343273 | A1* | 12/2013 | Barbieri | H04L 1/1822 370/328 |
| 2014/0211732 | A1* | 7/2014 | Nogami | H04L 5/001 370/329 |
| 2015/0237644 | A1* | 8/2015 | Golitschek Edler von Elbwart | H04W 72/12 370/329 |
| 2015/0245323 | A1* | 8/2015 | You | H04W 72/042 370/329 |

FOREIGN PATENT DOCUMENTS

| | | |
|---|---|---|
| EP | 2947802 A1 | 11/2015 |
| WO | WO-2013169164 A1 | 11/2013 |
| WO | WO-2014109621 A1 | 7/2014 |
| WO | WO-2014121489 A1 | 8/2014 |

OTHER PUBLICATIONS

International Search Report and Written Opinion—PCT/US2016/048049—ISA/EPO—dated Oct. 11, 2016.
LG Electronics: "Structure of PDCCH Search Space for Multiple Carrier Aggregation", 3GPP Draft; R1-102689, 3$^{RD}$ Generation Partnership Project (3GPP), Mobile Competence Centre ; 650, Route Des Lucioles ; F-06921 Sophia-Antipolis Cedex ; France, val. RAN WG 1, No. Montreal, Canada; May 10, 2010, May 4, 2010 (May 4, 2010), XP050419896, 7 pages. [retrieved on May 4, 2010].

* cited by examiner

SIGNALING AND DECODING WITH CROSS-TRANSMISSION TIME INTERVAL (TTI) OR CROSS-CARRIER REFERENCING

CLAIM OF PRIORITY UNDER 35 U.S.C. § 119

The present application claims the benefit of U.S. Provisional Patent Application Ser. No. 62/214,288, entitled "SIGNALING AND DECODING WITH CROSS-TRANSMISSION TIME INTERVAL (TTI) OR CROSS-CARRIER REFERENCING" and filed Sep. 4, 2015, which is assigned to the assignee of the present application and hereby expressly incorporated by reference herein in its entirety.

BACKGROUND

Field of the Disclosure

The present disclosure relates generally to wireless communication, and more particularly, to techniques for signaling and decoding a transmission.

Description of the Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

SUMMARY

Certain aspects of the present disclosure provide a method for wireless communication. The method generally includes transmitting first control information during a first transmission time interval (TTI), wherein the first control information indicates resources within a TTI allocated for a data transmission; transmitting the data using the indicated resources; and transmitting second control information, wherein the second control information also indicates the resources for the data transmission.

In certain aspects of the present disclosure, the method generally includes receiving a signal, during a first transmission time interval (TTI), wherein the signal, as transmitted by an apparatus, comprises a first control information, wherein the first control information indicates resources within a TTI for a data transmission; storing the received signal; receiving second control information, wherein the second control information also indicates the resources for the data transmission; and decoding the data transmission based on the resources indicated in the second control information In certain aspects of the present disclosure, the method generally includes transmitting first control information during a transmission time interval (TTI), wherein the first control information indicates resources within a TTI allocated for a first data transmission and resources within a TTI allocated for a second data transmission; and transmitting the first data transmission and the second data transmission using the resources indicated in the first control information.

In certain aspects of the present disclosure, the method generally includes receiving first control information during a transmission time interval (TTI), wherein the first control information indicates resources within a TTI allocated for a first data transmission and resources within a TTI allocated for a second data transmission; receiving the first data transmission and the second data transmission; and decoding the first data transmission or the second data transmission using the resources indicated in the first control information.

Certain aspects of the present disclosure provide an apparatus for wireless communication. The apparatus generally includes means for transmitting first control information during a first transmission time interval (TTI), wherein the first control information indicates resources within a TTI allocated for a data transmission; means for transmitting the data using the indicated resources; and means for transmitting second control information, wherein the second control information also indicates the resources for the data transmission.

Certain aspects of the present disclosure provide an apparatus for wireless communication. The apparatus generally includes means for receiving a signal, during a first transmission time interval (TTI), wherein the signal, as transmitted by an apparatus, comprises a first control information, wherein the first control information indicates resources within a TTI for a data transmission; means for storing the received signal; means for receiving second control information, wherein the second control information also indicates the resources for the data transmission; and means for decoding the data transmission based on the resources indicated in the second control information.

Certain aspects of the present disclosure provide an apparatus for wireless communication. The apparatus generally includes means for transmitting first control information during a transmission time interval (TTI), wherein the first control information indicates resources within a TTI allocated for a first data transmission and resources within a TTI allocated for a second data transmission; and means for transmitting the first data transmission and the second data transmission using the resources indicated in the first control information.

Certain aspects of the present disclosure provide an apparatus for wireless communication. The apparatus generally includes means for receiving first control information during a transmission time interval (TTI), wherein the first control information indicates resources within a TTI allocated for a first data transmission and resources within a TTI allocated for a second data transmission; means for receiving the first data transmission and the second data transmission; and means for decoding the first data transmission or the second data transmission using the resources indicated in the first control information.

Certain aspects of the present disclosure provide an apparatus for wireless communication. The apparatus generally includes at least one antenna; and a processing system, configured to: transmit, via the at least one antenna, first control information during a first transmission time interval (TTI), wherein the first control information indicates resources within a TTI allocated for a data transmission; transmit, via the at least one antenna, the data using the indicated resources; and transmit, via the at least one antenna, second control information, wherein the second control information also indicates the resources for the data transmission.

Certain aspects of the present disclosure provide an apparatus for wireless communication. The apparatus generally includes at least one antenna; a storage device; and a processing system configured to: receive, via the at least one antenna, a signal, during a first transmission time interval (TTI), wherein the signal, as transmitted by an apparatus, comprises a first control information, wherein the first control information indicates resources within a TTI for a data transmission; store the received signal in the storage device; receive, via the at least one antenna, second control information, wherein the second control information also indicates the resources for the data transmission; and decode the data transmission based on the resources indicated in the second control information.

Certain aspects of the present disclosure provide an apparatus for wireless communication. The apparatus generally includes at least one antenna; and a processing system configured to: transmit, via the at least one antenna, first control information during a transmission time interval (TTI), wherein the first control information indicates resources within a TTI allocated for a first data transmission and resources within a TTI allocated for a second data transmission; and transmit, via the at least one antenna, the first data transmission and the second data transmission using the resources indicated in the first control information.

Certain aspects of the present disclosure provide an apparatus for wireless communication. The apparatus generally includes at least one antenna; and a processing system configured to: receive, via the at least one antenna, first control information during a transmission time interval (TTI), wherein the first control information indicates resources within a TTI allocated for a first data transmission and resources within a TTI allocated for a second data transmission; receive, via the at least one antenna, the first data transmission and the second data transmission; and decode the first data transmission or the second data transmission using the resources indicated in the first control information.

Certain aspects of the present disclosure provide a computer readable medium comprising instructions that when executed cause an apparatus to: transmit first control information during a first transmission time interval (TTI), wherein the first control information indicates resources within a TTI allocated for a data transmission; transmit the data using the indicated resources; and transmit second control information, wherein the second control information also indicates the resources for the data transmission.

Certain aspects of the present disclosure provide a computer readable medium comprising instructions that when executed cause an apparatus to: receive a signal, during a first transmission time interval (TTI), wherein the signal, as transmitted by an apparatus, comprises a first control information, wherein the first control information indicates resources within a TTI for a data transmission; store the received signal; receive second control information, wherein the second control information also indicates the resources for the data transmission; and decode the data transmission based on the resources indicated in the second control information.

Certain aspects of the present disclosure provide a computer readable medium comprising instructions that when executed cause an apparatus to: transmit first control information during a transmission time interval (TTI), wherein the first control information indicates resources within a TTI allocated for a first data transmission and resources within a TTI allocated for a second data transmission; and transmitting the first data transmission and the second data transmission using the resources indicated in the first control information.

Certain aspects of the present disclosure provide a computer readable medium comprising instructions that when executed cause an apparatus to: receive first control information during a transmission time interval (TTI), wherein the first control information indicates resources within a TTI allocated for a first data transmission and resources within a TTI allocated for a second data transmission; receive the first data transmission and the second data transmission; and decode the first data transmission or the second data transmission using the resources indicated in the first control information.

Certain aspects of the present disclosure provide an eNodeB, comprising: at least one antenna; and a processing system, configured to: transmit, via the at least one antenna, first control information during a first transmission time interval (TTI), wherein the first control information indicates resources within a TTI allocated for a data transmission; transmit, via the at least one antenna, the data using the indicated resources; and transmit, via the at least one antenna, second control information, wherein the second control information also indicates the resources for the data transmission.

Certain aspects of the present disclosure provide a user equipment (UE), comprising: at least one antenna; a storage device; and a processing system configured to: receive, via the at least one antenna, a signal, during a first transmission time interval (TTI), wherein the signal, as transmitted by an apparatus, comprises a first control information, wherein the first control information indicates resources within a TTI for a data transmission; store the received signal in the storage device; receive, via the at least one antenna, second control information, wherein the second control information also indicates the resources for the data transmission; and decode the data transmission based on the resources indicated in the second control information.

Certain aspects of the present disclosure provide an eNodeB, comprising: at least one antenna; and a processing system configured to: transmit, via the at least one antenna, first control information during a transmission time interval (TTI), wherein the first control information indicates resources within a TTI allocated for a first data transmission and resources within a TTI allocated for a second data transmission; and transmit, via the at least one antenna, the first data transmission and the second data transmission using the resources indicated in the first control information.

Certain aspects of the present disclosure provide a user equipment (UE), comprising: at least one antenna; and a processing system configured to: receive, via the at least one antenna, first control information during a transmission time interval (TTI), wherein the first control information indicates resources within a TTI allocated for a first data transmission and resources within a TTI allocated for a second data transmission; receive, via the at least one antenna, the first data transmission and the second data transmission; and decode the first data transmission or the second data transmission using the resources indicated in the first control information.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
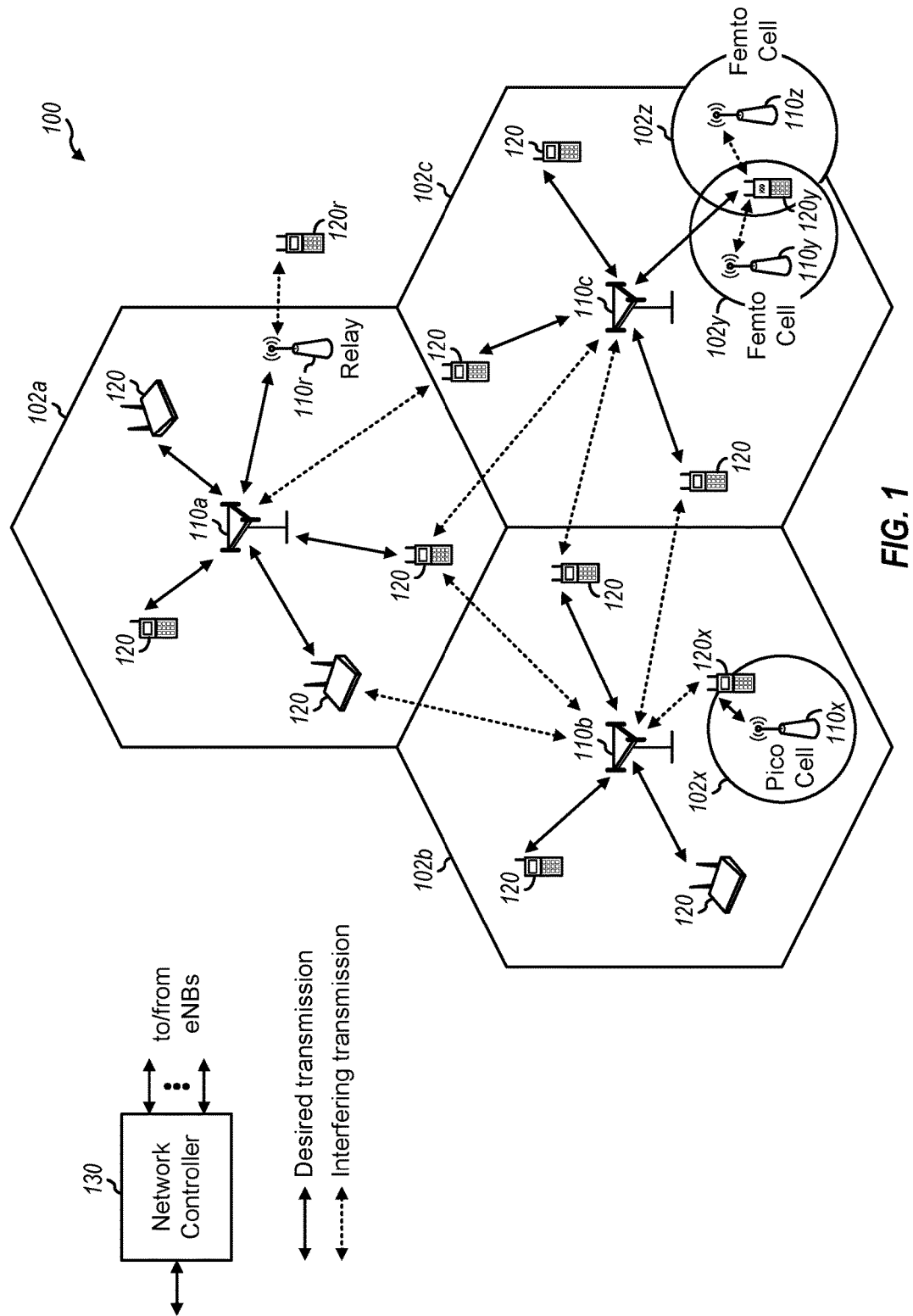
FIG. 1 is a block diagram conceptually illustrating an example of a telecommunications system in accordance with an aspect of the present disclosure.

Aspects of the present disclosure provide techniques for improving reliability and latency of wireless communications by alternative means for a receiver to determine resources allocated to a data transmission. For example, in certain aspects of the present disclosure, a transmitter may transmit multiple control information resource blocks that indicate resources allocated for a same data transmission.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a block diagram conceptually illustrating an example of a telecommunications network system 100 in which an aspects of the present disclosure may be practiced. For example, the telecommunications network system 100 may be an LTE network. The telecommunications network system 100 may include a number of evolved NodeBs (eNodeBs) 110 and user equipment (UEs) 120 and other network entities. An eNodeB 110 may be a station that communicates with the UEs 120 and may also be referred to as a base station, an access point, etc. A NodeB is another example of a station that communicates with the UEs 120. An eNodeB or NodeB may perform operations set forth in FIGS. 7-8 and 12-13, in accordance with aspects of the present disclosure. Similarly, a UE may perform operations set forth in FIGS. 7-8 and 12-13, in accordance with aspects of the present disclosure.

Each eNodeB 110 may provide communication coverage for a particular geographic area. In 3GPP, the term "cell" can refer to a coverage area of an eNodeB 110 and/or an eNodeB subsystem serving the coverage area, depending on the context in which the term is used.

An eNodeB 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 may be subscribed to a Closed Subscriber Group (CSG), UEs 120 for users in the home, etc.). An eNodeB 110 for a macro cell may be referred to as a macro eNodeB. An eNodeB 110 for a pico cell may be referred to as a pico eNodeB. An eNodeB 110 for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB 110 may provide communication coverage for one or more (e.g., three) cells.

The telecommunications network system 100 may include one or more relay stations 110r and 120r, that may also be referred to as a relay eNodeB, a relay, etc. The relay station 110r may be a station that receives a transmission of data and/or other information from an upstream station (e.g., an eNodeB 110 or a UE 120) and sends the received transmission of the data and/or other information to a downstream station (e.g., a UE 120 or an eNodeB 110). The relay station 120r may be a UE that relays transmissions for other UEs (not shown). In the example shown in FIG. 1, the relay station 110r may communicate with the eNodeB 110a and the UE 120r in order to facilitate communication between the eNodeB 110a and the UE 120r. Relay stations 110r and 120r may perform operations set forth in FIGS. 7-8, and 12-13, in accordance with aspects of the present disclosure.

The telecommunications network system 100 may be a heterogeneous network that includes eNodeBs 110 of different types, e.g., macro eNodeBs 110a-c, pico eNodeBs 110x, femto eNodeBs 110y-z, relay stations 110r, etc. These different types of eNodeBs 110 may have different transmit power levels, different coverage areas, and different impact on interference in the telecommunications network system 100. For example, macro eNodeBs 110a-c may have a high transmit power level (e.g., 20 Watts) whereas pico eNodeBs 110x, femto eNodeBs 110y-z and relays 110r may have a lower transmit power level (e.g., 1 Watt).

The telecommunications network system 100 may support synchronous or asynchronous operation. For synchronous operation, the eNodeBs 110 may have similar frame timing, and transmissions from different eNodeBs 110 and may be approximately aligned in time. For asynchronous operation, the eNodeBs 110 may have different frame timing, and transmissions from different eNodeBs 110 and may not be aligned in time. The techniques described herein may be used for both synchronous and asynchronous operation.

A network controller 130 may be coupled to a set of eNodeBs 110 and provide coordination and control for these eNodeBs 110. The network controller 130 may communicate with the eNodeBs 110 via a backhaul (not shown). The eNodeBs 110 may also communicate with one another, e.g., directly or indirectly via wireless or wire line backhaul (e.g., X2 interface) (not shown).

The UEs 120 (e.g., 120x, 120y, etc.) may be dispersed throughout the telecommunications network system 100, and each UE 120 may be stationary or mobile. For example, the UE 120 may be referred to as a terminal, a mobile station, a subscriber unit, a station, etc. In another example, the UE 120 may be a cellular phone, a personal digital assistant (PDA), a wireless modem, a wireless communication device, a handheld device, a laptop computer, a cordless phone, a wireless local loop (WLL) station, a tablet, a netbook, a smart book, etc. The UE 120 may be able to communicate with macro eNodeBs 110a-c, pico eNodeBs 110x, femto eNodeBs 110y-z, relays 110r, etc. For example, in FIG. 1, a solid line with double arrows may indicate desired transmissions between a UE 120 and a serving eNodeB 110, which is an eNodeB 110 designated to serve the UE 120 on the downlink and/or uplink. A dashed line with double arrows may indicate interfering transmissions between a UE 120 and an eNodeB 110.

LTE may utilize orthogonal frequency division multiplexing (OFDM) on the downlink and single-carrier frequency division multiplexing (SC-FDM) on the uplink. OFDM and SC-FDM may partition the system bandwidth into multiple (K) orthogonal subcarriers, which are also commonly referred to as tones, bins, etc. Each subcarrier may be modulated with data. In general, modulation symbols may be sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10 or 20 megahertz (MHz), respectively. The system bandwidth may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
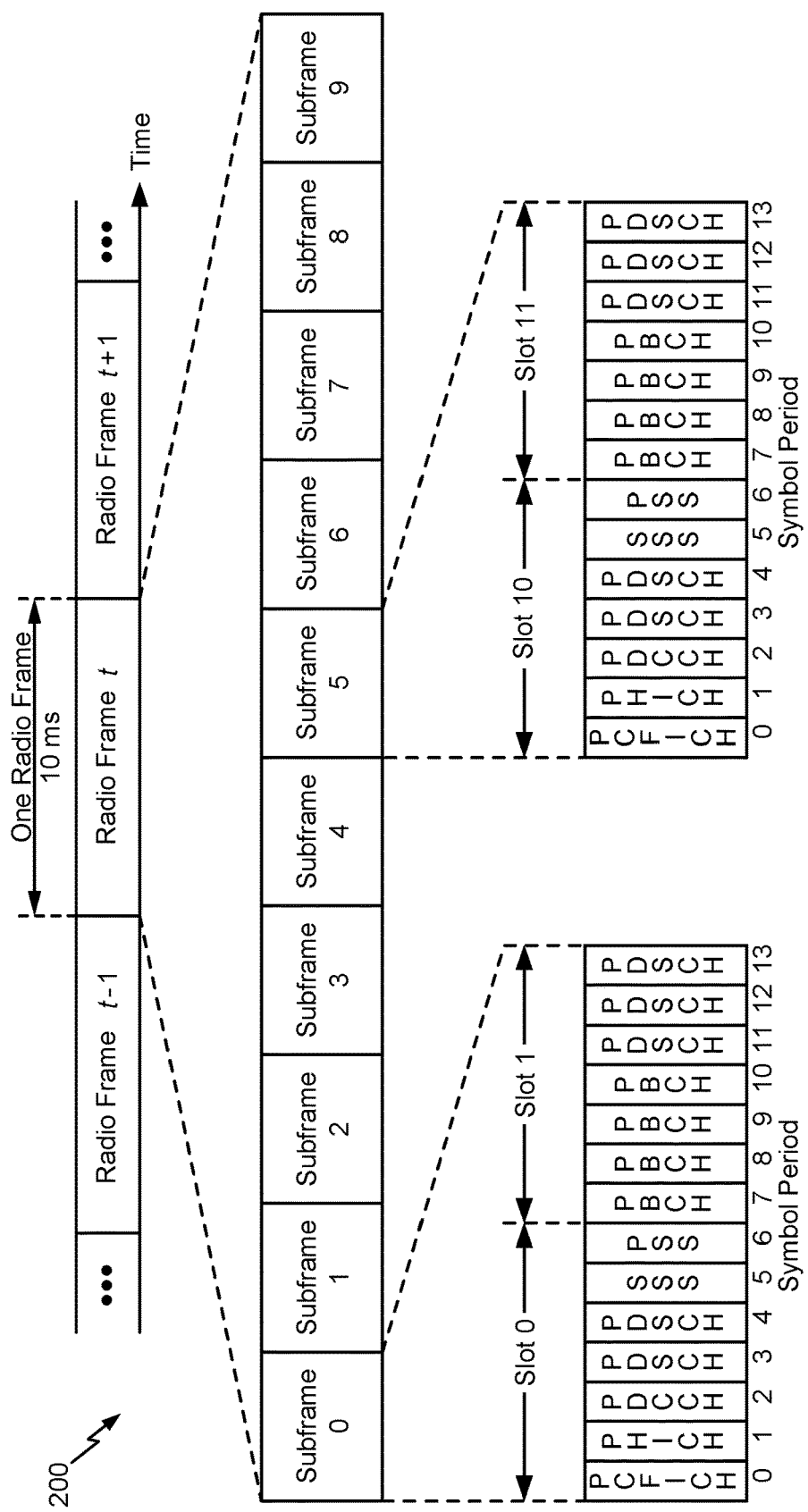
FIG. 2 is a block diagram conceptually illustrating an example of a down link frame structure in a telecommunications system in accordance with an aspect of the present disclosure.

FIG. 2 is a block diagram conceptually illustrating an example of a downlink frame structure in a telecommunications system in accordance with an aspect of the present disclosure. The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix (not shown). The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, for example, an eNodeB may send a primary synchronization signal (PSS) and a secondary synchronization signal (SSS) for each cell in the coverage area of the eNodeB. The primary synchronization signal (PSS) and secondary synchronization signal (SSS) may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The eNodeB may send system information in a Physical Broadcast Channel (PBCH) in symbol periods 0 to 3 of slot 1 of subframe 0.

The eNodeB may send information in a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send information in a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it may be understood that the PDCCH and PHICH are also included in the first symbol period. Similarly, the PHICH and PDCCH are also both in the second and third symbol periods, although not shown that way in FIG. 2. The eNodeB may send information in a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH around the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs in the coverage area. The eNodeB may send the PDCCH in a unicast manner to specific UEs in the coverage area. The eNodeB may also send the PDSCH in a unicast manner to specific UEs in the coverage area.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage areas of multiple eNodeBs. One of these eNodeBs may be selected to serve the UE. The serving eNodeB may be selected based on various criteria such as received power, path loss, signal-to-noise ratio (SNR), etc.

Figure 3:
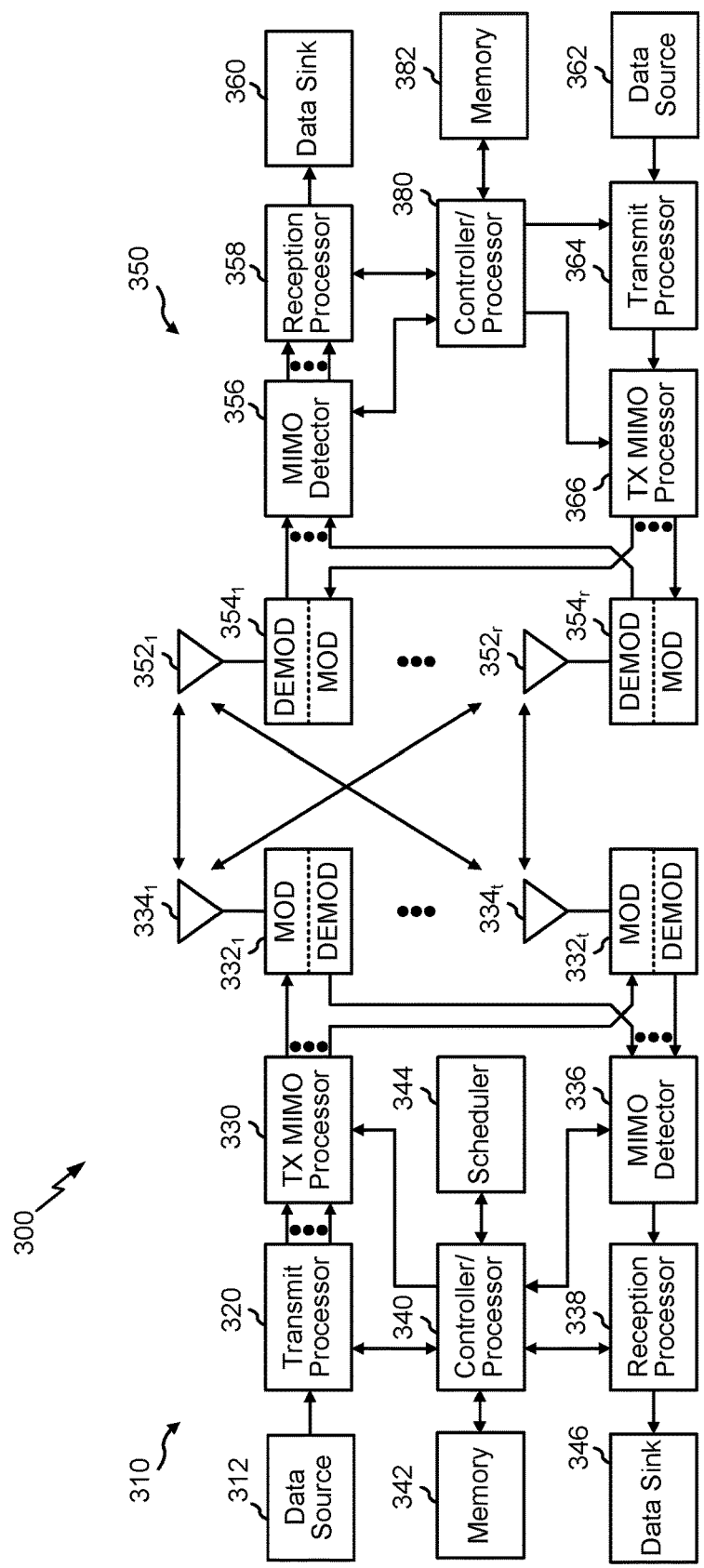
FIG. 3 is a block diagram conceptually illustrating an exemplary eNodeB and an exemplary UE configured in accordance with an aspect of the present disclosure.

FIG. 3 is a block diagram 300 conceptually illustrating an exemplary eNodeB 310 and an exemplary UE 350 configured in accordance with an aspect of the present disclosure. For example, the base station/eNodeB 310 and the UE 350, as shown in FIG. 3, may be one of the base stations/eNodeBs 110 and one of the UEs 120 in FIG. 1. The base station 310 may be equipped with antennas $334_{1-t}$, and the UE 350 may be equipped with antennas $352_{1-r}$, wherein t and r are integers greater than or equal to one.

At the base station 310, a base station transmit processor 320 may receive data from a base station data source 312 and control information from a base station controller/processor 340. The control information may be carried on the PBCH, PCFICH, PHICH, PDCCH, etc. The data may be carried on the PDSCH, etc. The base station transmit processor 320 may process (e.g., encode and symbol map) the data and control information to obtain data symbols and control symbols, respectively. The base station transmit processor 320 may also generate reference symbols, e.g., for the PSS, SSS, and cell-specific reference signal (RS). A base station transmit (TX) multiple-input multiple-output (MIMO) processor 330 may perform spatial processing (e.g., precoding) on the data symbols, the control symbols, and/or the reference symbols, if applicable, and may provide output symbol streams to the base station modulators/demodulators (MODs/DEMODs) $332_{1-t}$. Each base station MOD/DEMOD 332 may process a respective output symbol stream (e.g., for OFDM, etc.) to obtain an output sample stream. Each base station modulator/demodulator 332 may further process (e.g., convert to analog, amplify, filter, and upconvert) the output sample stream to obtain a downlink signal. Downlink signals from modulators/demodulators $332_{1-t}$ may be transmitted via the antennas $334_{1-t}$, respectively.

At the UE 350, the UE antennas $352_{1-r}$ may receive the downlink signals from the base station 310 and may provide received signals to the UE modulators/demodulators (MODs/DEMODs) $354_{1-r}$, respectively. Each UE MOD/DEMOD 354 may condition (e.g., filter, amplify, downconvert, and digitize) a respective received signal to obtain input samples. Each UE modulator/demodulator 354 may further process the input samples (e.g., for OFDM, etc.) to obtain received symbols. A UE MIMO detector 356 may obtain received symbols from all the UE modulators/demodulators $354_{1-r}$, and perform MIMO detection on the received symbols if applicable, and provide detected symbols. A UE reception processor 358 may process (e.g., demodulate, deinterleave, and decode) the detected symbols, provide decoded data for the UE 350 to a UE data sink 360, and provide decoded control information to a UE controller/processor 380.

On the uplink, at the UE 350, a UE transmit processor 364 may receive and process data (e.g., for the PUSCH) from a UE data source 362 and control information (e.g., for the PUCCH) from the UE controller/processor 380. The UE transmit processor 364 may also generate reference symbols for a reference signal. The symbols from the UE transmit processor 364 may be precoded by a UE TX MIMO processor 366 if applicable, further processed by the UE modulator/demodulators $354_{1-r}$ (e.g., for SC-FDM, etc.), and transmitted to the base station 310. At the base station 310, the uplink signals from the UE 350 may be received by the base station antennas 334, processed by the base station modulators/demodulators 332, detected by a base station MIMO detector 336 if applicable, and further processed by a base station reception processor 338 to obtain decoded data and control information sent by the UE 350. The base station reception processor 338 may provide the decoded data to a base station data sink 346 and the decoded control information to the base station controller/processor 340.

The base station controller/processor 340 and the UE controller/processor 380 may direct the operation at the base station 310 and the UE 350, respectively. The base station controller/processor 340 and/or other processors and modules at the base station 310 may perform or direct, e.g., the execution of various processes for the techniques described herein. For example, the base station controller/processor 340 may perform or direct the operations set forth in FIGS. 7-8 and 12-13. The UE controller/processor 380 and/or other processors and modules at the UE 350 may also perform or direct, e.g., the execution of the operations set forth in FIGS. 7-8 and 12-13, and/or other processes for the techniques described herein. The base station memory 342 and the UE memory 382 may store data and program codes for the base station 310 and the UE 350, respectively. A scheduler 344 may schedule UEs 350 for data transmission on the downlink and/or uplink.

In one configuration, the base station 310 may include means for generating a compact Downlink Control Information (DCI) for at least one of uplink (UL) or downlink (DL) transmissions, wherein the compact DCI comprises a reduced number of bits when compared to certain standard DCI formats; and means for transmitting the DCI. In one aspect, the aforementioned means may be the base station controller/processor 340, the base station memory 342, the base station transmit processor 320, the base station modulators/demodulators 332, and the base station antennas 334 configured to perform the functions recited by the aforementioned means. In another aspect, the aforementioned means may be a module or any apparatus configured to perform the functions recited by the aforementioned means. In one configuration, the UE 350 may include means for receiving compact Downlink Control Information (DCI) for at least one of uplink (UL) or downlink (DL) transmissions, wherein the DCI comprises a reduced number of bits of a standard DCI format; and means for processing the DCI. In one aspect, the aforementioned means may be the UE controller/processor 380, the UE memory 382, the UE reception processor 358, the UE MIMO detector 356, the UE modulators/demodulators 354, and the UE antennas 352 configured to perform the functions recited by the aforementioned means. In another aspect, the aforementioned means may be a module or any apparatus configured to perform the functions recited by the aforementioned means.

Figure 4:
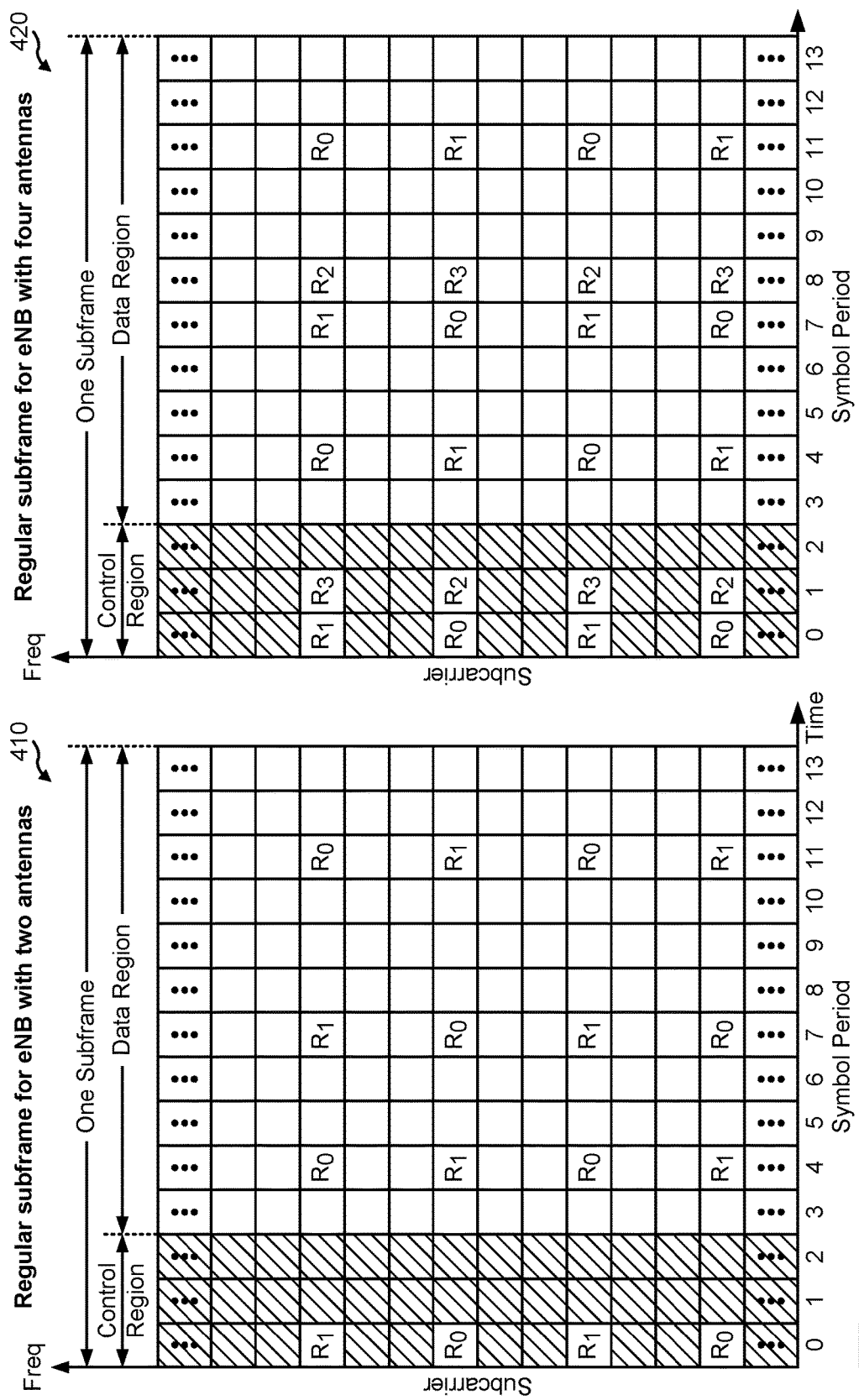
FIG. 4 illustrates various exemplary subframe resource element mappings, in accordance with aspects of the present disclosure.

FIG. 4 illustrates various exemplary subframe resource element mappings in accordance with an aspect of the present disclosure. For example, FIG. 4 illustrates two exemplary subframe formats 410 and 420 for the downlink with the normal cyclic prefix. The available time frequency resources for the downlink may be partitioned into resource blocks. Each resource block may include 12 subcarriers in one slot and may include a number of resource elements. Each resource element may correspond to one subcarrier in one symbol period and may be used to send one modulation symbol, which may be a real or complex value.

The subframe format 410 may be used for an eNodeB equipped with two antennas. A common reference signal (CRS) may be transmitted from antennas 0 and 1 in symbol periods 0, 4, 7 and 11. A common reference signal (CRS) is a signal that is known a priori by a transmitter and a receiver and may also be referred to as a pilot signal. A common reference signal (CRS) may be a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. The subframe format 420 may be used for an eNodeB equipped with four antennas. A common reference signal (CRS) may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNodeBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in a communication network (e.g., LTE network). For example, Q interlaces with indices of 0 through Q−1 may be defined, where Q may be equal to 4, 6, 8, 10, or some other value. Each interlace may include subframes that may be spaced apart by Q subframes. In particular, interlace q may include subframes q, q+Q, q+2Q, etc., where qε(0, 1, . . . , Q−1).

The wireless communication network may support hybrid automatic retransmission (HARQ) for data transmission on the downlink and uplink. For HARQ, a transmitter (e.g., at an eNodeB) may send one or more transmissions of a data packet until the data packet is decoded correctly by a receiver (e.g., at a UE) or some other termination condition is encountered. For synchronous HARQ, all transmissions of the data packet may be sent in subframes of a single interlace. For asynchronous HARQ, each transmission of the data packet may be sent in any subframe.

A UE may be located within the geographic coverage area of multiple eNodeBs. One of the eNodeBs may be selected to serve the UE and may be called "serving eNodeB," while other eNodeB(s) may be called "neighboring eNodeB(s)." The serving eNodeB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more neighboring eNodeBs.

UEs (e.g., LTE-Advanced enabled UEs) may use spectrum of up to 20 MHz bandwidths for each component carrier. A plurality of component carriers may be allocated in a carrier aggregation configuration of up to a total of 100 MHz (5 component carriers) used for transmission and reception. For the LTE-Advanced enabled wireless communication systems, two types of carrier aggregation (CA) methods have been proposed, contiguous CA and non-contiguous CA, which are illustrated in FIGS. 5 and 6, respectively.

Figure 5:
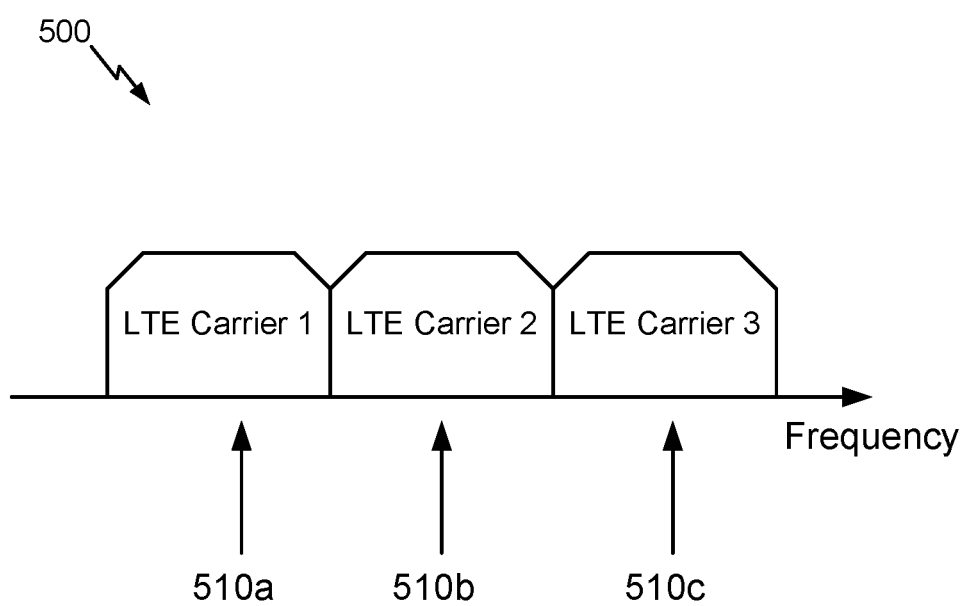
FIG. 5 illustrates contiguous carrier aggregation, in accordance with aspects of the present disclosure.

FIG. 5 illustrates contiguous CA 500, in which multiple available component carriers 510 adjacent to each other along the frequency band are aggregated. As illustrated, component carriers 510*a*, 510*b*, and 510*c* are adjacent to each other along the frequency band and aggregated together in a contiguous CA configuration. While three component carriers are illustrated, more or fewer component carriers may be aggregated in a contiguous CA configuration.

Figure 6:
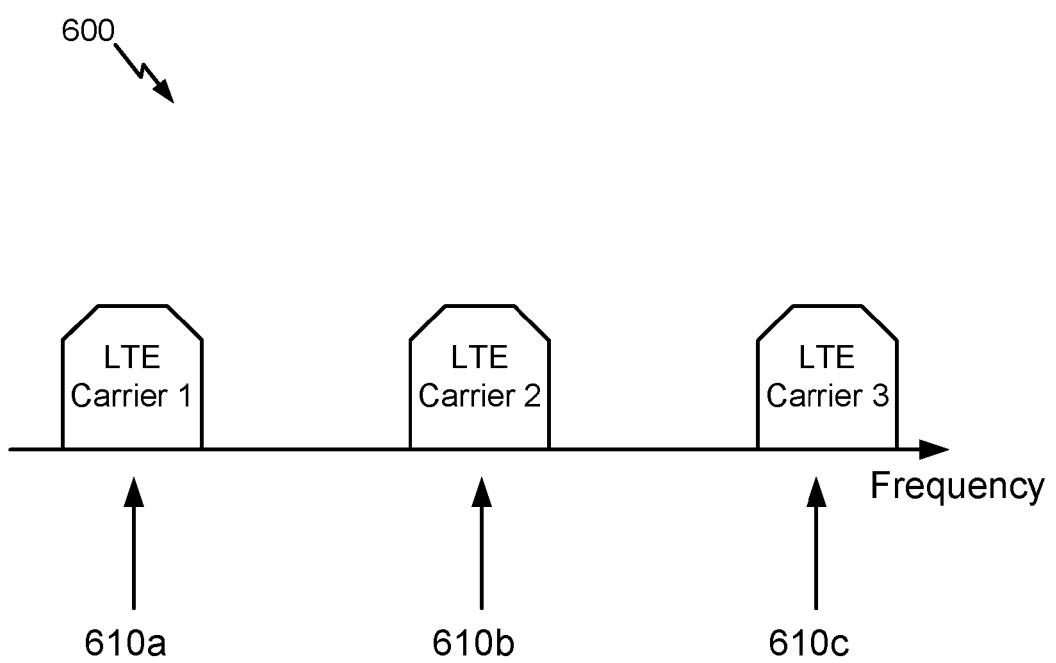
FIG. 6 illustrates non-contiguous carrier aggregation, in accordance with aspects of the present disclosure.

FIG. 6 illustrates non-contiguous CA 600, in which multiple available component carriers 610 separated along the frequency band are aggregated. As illustrated, component carriers 610*a*, 610*b*, and 610*c* are separated along the frequency band and aggregated together in a non-contiguous CA configuration. While three component carriers are illustrated, more or fewer component carriers may be aggregated in a non-contiguous CA configuration.

Both non-contiguous and contiguous CA may aggregate multiple component carriers to serve a single LTE-Advanced UE. In various examples, the UE operating in a multicarrier system (also referred to as carrier aggregation) is configured to aggregate certain functions of multiple carriers, such as control and feedback functions, on the same carrier, which may be referred to as a "primary component carrier" (PCC) or "primary carrier." The remaining carriers that depend on the primary carrier for support may be referred to as "secondary component carriers" (SCC) or "associated secondary carriers." For example, the control functions, such as those provided by the optional dedicated channel (DCH), the nonscheduled grants, a physical uplink control channel (PUCCH), and/or a physical downlink control channel (PDCCH) for multiple component carriers may be carried/transmitted on a PCC of a cell.

In certain wireless communications networks, such as LTE networks, both Frequency Division Duplex (FDD) and Time Division Duplex (TDD) frame structures are supported. In a network using FDD, BSs transmit and UEs receive on a first set of frequencies, while UEs transmit and BSs receive on a second set of frequencies. The FDD frame structure may be a radio frame having ten subframes of equal length, and all subframes may be used for either uplink or downlink. In a network using TDD, BSs transmit and UEs receive at certain times, while UEs transmit and BSs receive at certain other times, all on the same set of frequencies. Accordingly, the TDD frame structure may be a radio frame having ten subframes of equal length, with some subframes used for uplink, other subframes used for downlink, and some subframes, referred to as special subframes, used for switching from downlink to uplink.

Signaling and Decoding with Cross-Transmission Time Interval (TTI) or Cross-Carrier Referencing Control information may be used to provide allocation information corresponding to resource blocks allocated for a data transmission. Thus, a receiving device may first determine the location of the data transmission by decoding the control information. Therefore, if for any reason the receiving device is unable to decode the control information, the receiving device may be unable to decode the corresponding data transmission, even though the data transmission may be available in the signal transmission.

Aspects of the present disclosure, however, provide techniques for a receiver to decode the data transmission, even if the receiving device is unable to decode an instance of the corresponding control information. For example, certain aspects of the present disclosure take advantage of resources across multiple TTIs and sub-carriers to communicate control information. The techniques provided herein may increase reliability and decrease latency of wireless communications, which are becoming more and more important with next-generation wide-band wireless system designs.

According to certain aspect, a transmitter may transmit a signal to a receiver during a first transmission time interval (TTI) having control information along with a data transmission. However, if an acknowledgement or a negative acknowledgement (ACK/NACK) corresponding to the signal transmission is not received from the receiver, the transmitter may use resources available in a second TTI to retransmit the control information for the data that was transmitted in the first TTI. Thus, a receiving device may be configured to store the received signal during the first TTI, and use the control information from the second TTI to decode the data transmission in the first TTI. In certain aspects, a repetition or redundancy version of the control information may be transmitted by the transmitter during the first TTI, or across multiple carriers, which may be used by the receiver to decode the data transmission.

Figure 7:
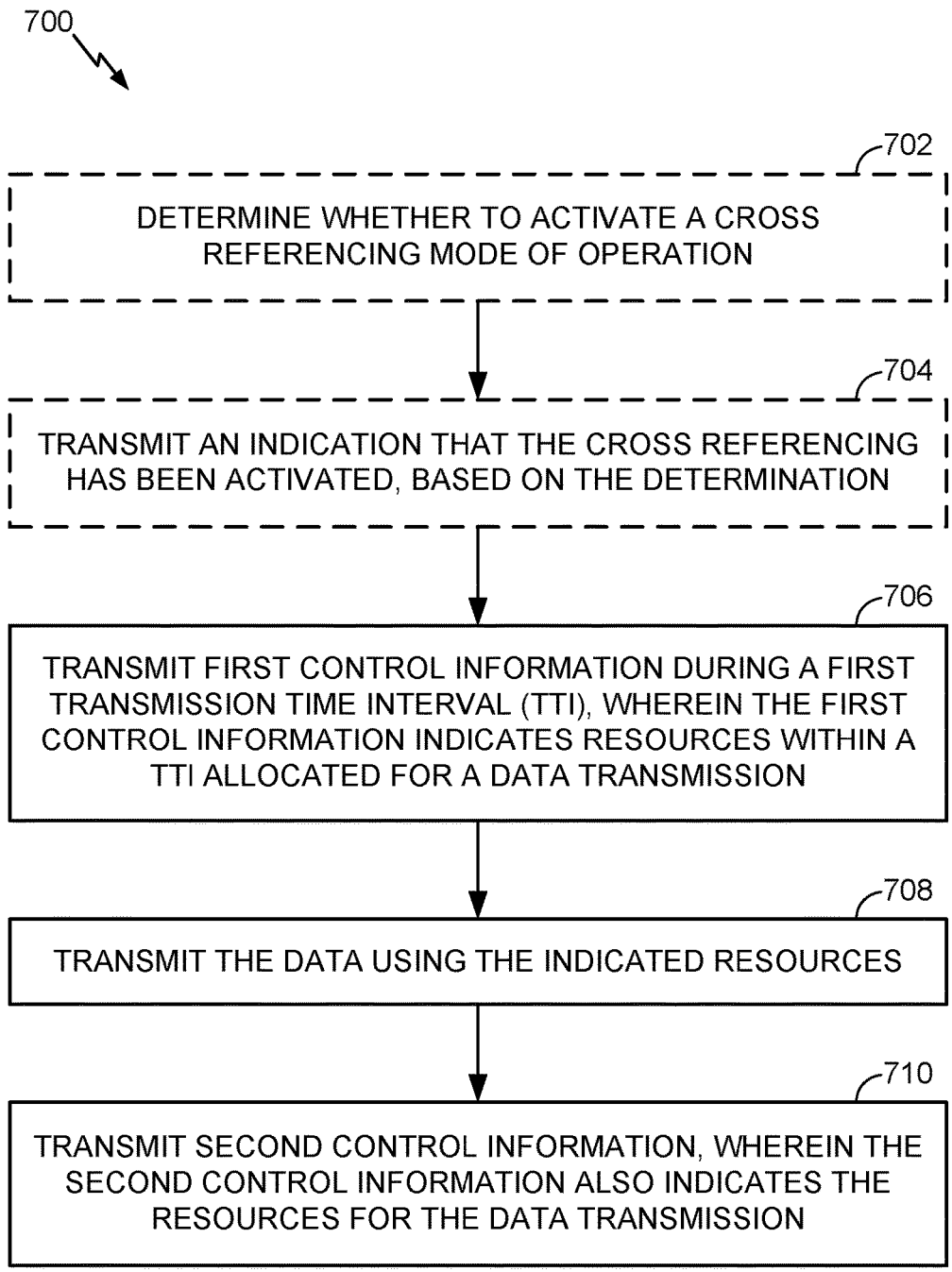
FIG. 7 illustrates example operations for re-transmitting control information indicating resources allocated for a data transmission, in accordance with aspects of the present disclosure.

FIG. 7 illustrates example operations 700 for wireless communication, in accordance with aspects of the present disclosure. The operations 700 may be performed, for example, by a transmitter such as eNodeB 310 or user equipment 350.

The operations 700 may optionally begin, at 702, by the transmitter determining to activate a cross referencing mode of operation. For example, the transmitter may determine to activate cross referencing based on channel quality information or based on a recommendation to activate the cross referencing mode of operation from another apparatus. Once the cross-referencing mode of operation has been activated, the transmitter, at 704, may transmit an indication to the receiver that cross-referencing has been activated. Based on this indication, the receiver may take one or more actions, which are described in more detail with respect to FIG. 8.

The operations 700 continue at 706, with the transmitter transmitting first control information during a first transmission time interval (TTI), wherein the first control information indicates resources within a TTI allocated for a data transmission. In certain aspects, the data transmission may be included in the first TTI, and the control information may indicate resource block allocation resource information for the data transmission in the first TTI. At 708, the transmitter transmits the data using the indicated resources.

At 710, the transmitter transmits second control information, wherein the second control information also indicates the resources for the data transmission. In certain aspects, transmitting the second control information may be based on a determination by the transmitter that an ACK/NACK corresponding to the data transmission has not been received.

Figure 8:
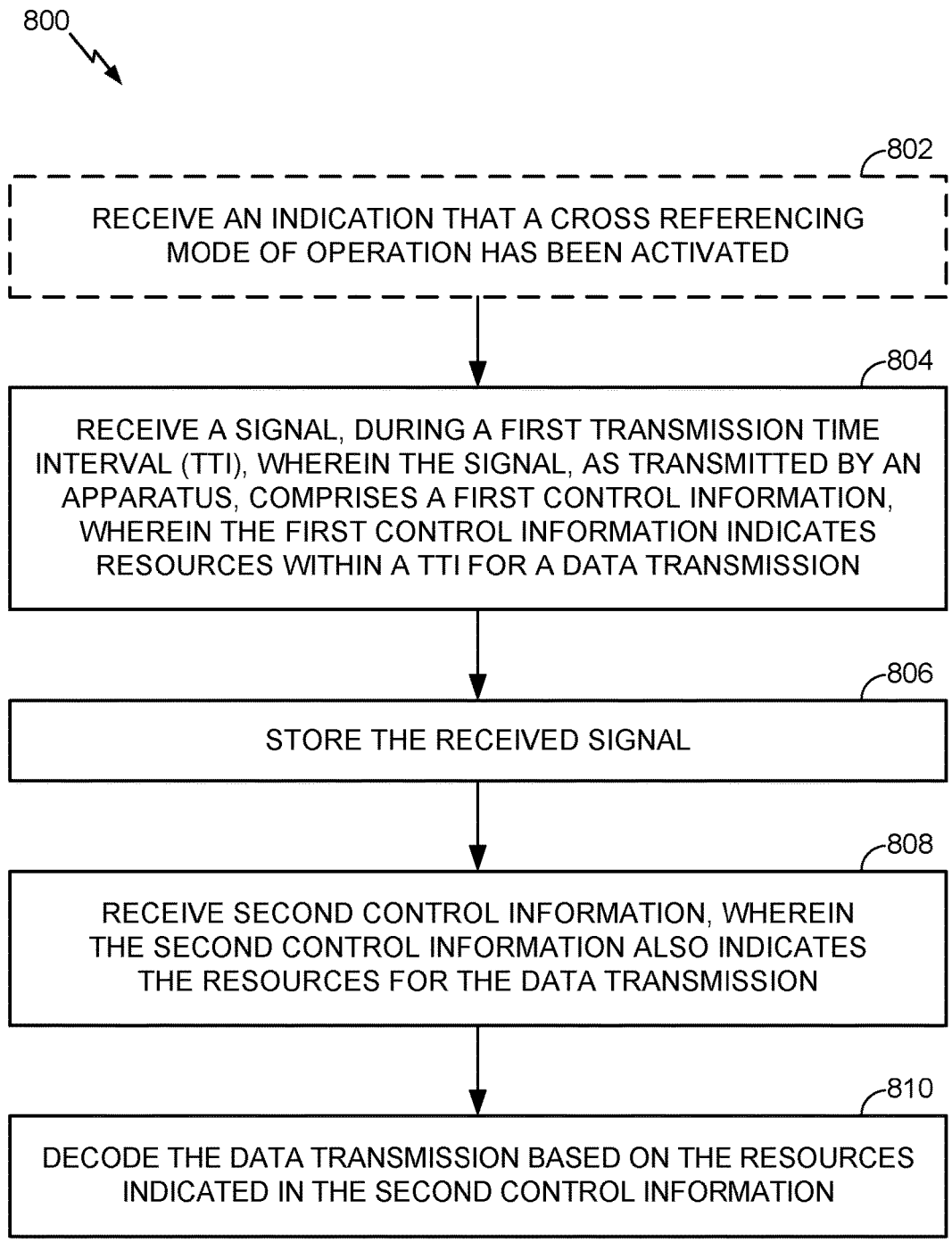
FIG. 8 illustrates example operations for receiving a re-transmission of control information indicating resources allocated for a data transmission, in accordance with aspects of the present disclosure.

FIG. 8 illustrates example operations 800 in accordance with aspects of the present disclosure. The operations 800 may be performed, for example, by a receiver such as eNodeB 310 or user equipment 350.

The operations 800 may optionally begin, at 802, by receiving an indication that a cross-referencing mode of operation has been activated. The operations continue at 804, by receiving a signal, during a first transmission time interval (TTI), wherein the signal, as transmitted by an apparatus, comprises a first control information, wherein the first control information indicates resources within a TTI for a data transmission. For example, the received signal may be transmitted by the transmitter as described with reference to FIG. 7.

The operations 800 continue at 806 with the receiver storing the received signal. In certain aspects, storing the received signal may be in response to an indication from the transmitter that a cross-referencing mode of operation has been activated and/or a determination by the receiver that the first control information cannot be decoded. The operations 800 continue, at 808, by receiving second control information, wherein the second control information also indicates the resources for the data transmission. That is, the second control information may be a repetition or redundancy version of the first control information. At 810, the receiver decodes the data transmission based on the resources indicated in the second control information.

The operations of FIGS. 7 and 8 may be described with reference to FIGS. 9-11, which illustrate examples of transmitting multiple instances of control information that reference the same data.

Figure 9:
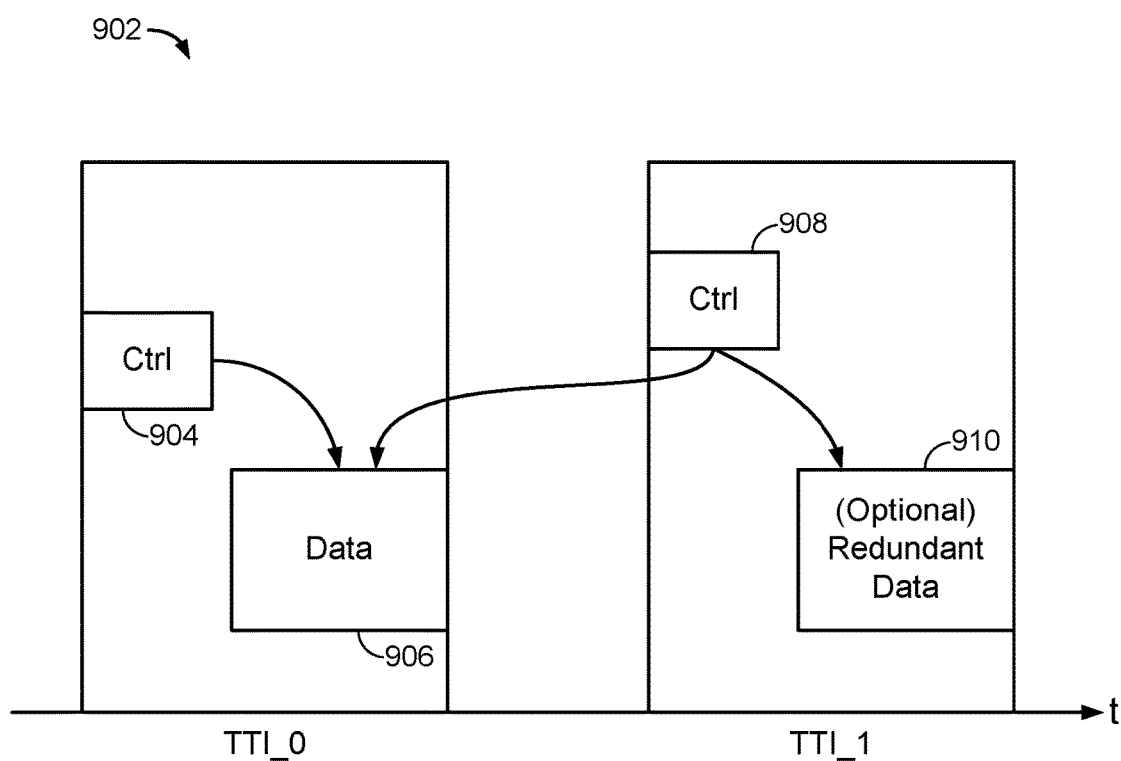
FIG. 9 illustrates an example of re-transmission of control information indicating resources allocated for a data transmission, in accordance with aspects of the present disclosure.

FIG. 9 illustrates a re-transmission of control information across multiple TTIs (e.g., cross-TTI referencing), according to certain aspects of the present disclosure. As illustrated, a transmitter may transmit a signal 902 during TTI_0, which includes control information 904 that indicates resources within TTI_0 allocated for data transmission 906.

However, as presented above, a receiver may not be able to decode the control information 904 and obtain resource allocation information corresponding to data transmission 906. As a result, the receiver may not be able to decode the data transmission 906 and provide a corresponding acknowledgement for the data transmission 906. In this case, if the cross-TTI referencing mode has been activated (e.g., by the transmitter), the transmitter may include a retransmission of the control information 908 during TTI_1. That is, the retransmission of the control information 908 may indicate the validity of the data 906 in TTI_0 and also indicate resources within TTI_0 allocated for data transmission 906.

From the receiver's perspective, if cross-TTI referencing mode has been activated, the receiver may store the signal 902, such that the data transmission 906 can be decoded using the control information 908 (e.g., a retransmission of control information 904 in TTI_0) provided in TTI_1. For example, the receiver may store a suitable set of RB resources in a buffer for TTI_0 which can be decoded at a later time based on control information 908.

In certain aspects, the transmitter may also include a redundant data transmission 910 in TTI_1 (e.g., repetition or redundancy version of the data transmission in TTI_0), a resource allocation of which may be indicated in control information 908. If the transmitter also transmits a redundant copy of data in TTI_1 as indicated in the control information 908, the receiver may combine data signals 906, 910 received between TTI_0 and TTI_1 for decoding to increase reliability. In certain aspects, the transmitter may include the redundant data transmission 910 upon a determination that the data transmission 906 of signal 902 may be corrupt.

In certain aspects, the control information 904 may include an indication that the redundant copy of data 910 will be transmitted in TTI_1. In this case, the control information 904 may also include resource allocation information for the redundant data 910.

Figure 10:
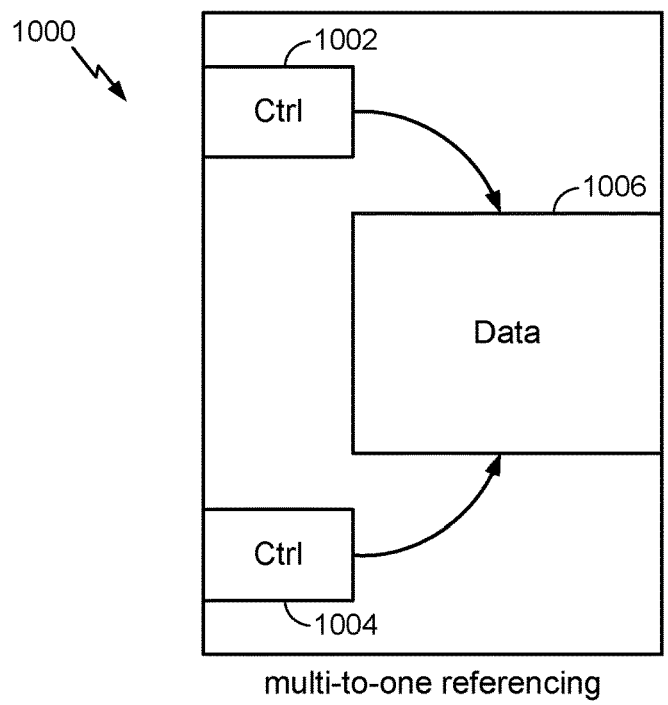
FIG. 10 illustrates an example of a plurality of control information resource blocks indicating resources allocated for a same data transmission, in accordance with aspects of the present disclosure.

FIG. 10 illustrates a signal 1000 transmitted during a TTI having multiple control information resource blocks 1002, 1004, which indicate resources allocated for a data transmission 1006, according to certain aspects of the present disclosure. That is, control information 1004 may be a redundant copy of control information 1002.

Thus, where a receiver is unable to decode control information 1002, the receiver may still be able to use the data transmission 1006 because the receiver can determine the resource allocated to the data transmission 1006 via the control information 1004 (e.g., redundant copy of control information 1002).

In certain aspects, the control information 1004 may be transmitted in a different component carrier than control information 1002. For example, control information 1002 may be transmitted on a first component carrier, along with the data transmission 1006, while control information 1004 may be transmitted on a second component carrier. By including multiple control information resource blocks that indicate the resources allocated for a same data transmission 1006, reliability and latency of communications between the transmitter and receiver may be improved.

Figure 11:
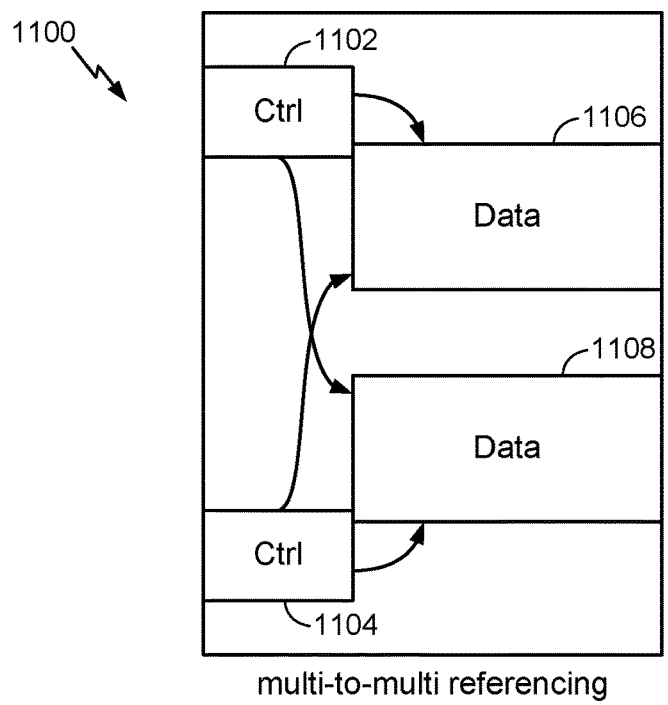
FIG. 11 illustrates an example of a plurality of control information resource blocks, each indicating resources allocated for a plurality of data transmission, in accordance with aspects of the present disclosure.

FIG. 11 illustrates a signal 1100 transmitted during a TTI having multiple control information resource blocks 1102, 1104, each indicating resources allocated for multiple data transmissions 1106, 1108, according to certain aspects of the present disclosure. While FIG. 11 illustrates two data transmission 1106, 1108 to facilitate understanding, each of the control information resource blocks 1102, 1104 may indicate resources allocated for any number of data transmissions. In certain aspects, data transmission 1108 may be a repetition or redundancy version of data transmission 1106 and a receiver may combine multiple instances of data transmissions 1106, 1108 to decode the data.

In certain embodiments, the control information 1102, control information 1104, data transmission 1106, and data transmission 1108 may be transmitted on different component carriers. For example, control information 1102 may be transmitted on a first component carrier, along with data transmission 1106, and the control information 1104 may be transmitted on a second component carrier along with data transmission 1108.

Figure 12:
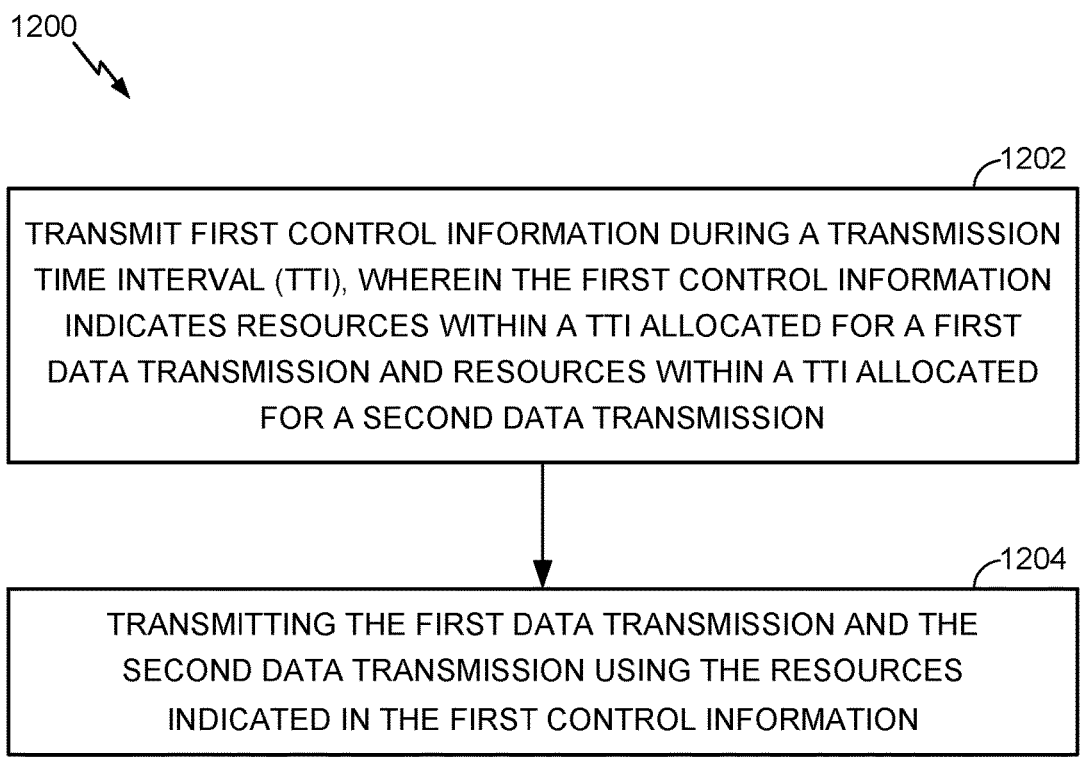
FIG. 12 illustrates example operations for transmitting control information indicating resources allocated for a plurality of data transmissions, in accordance with aspects of the present disclosure.
Figure 13:
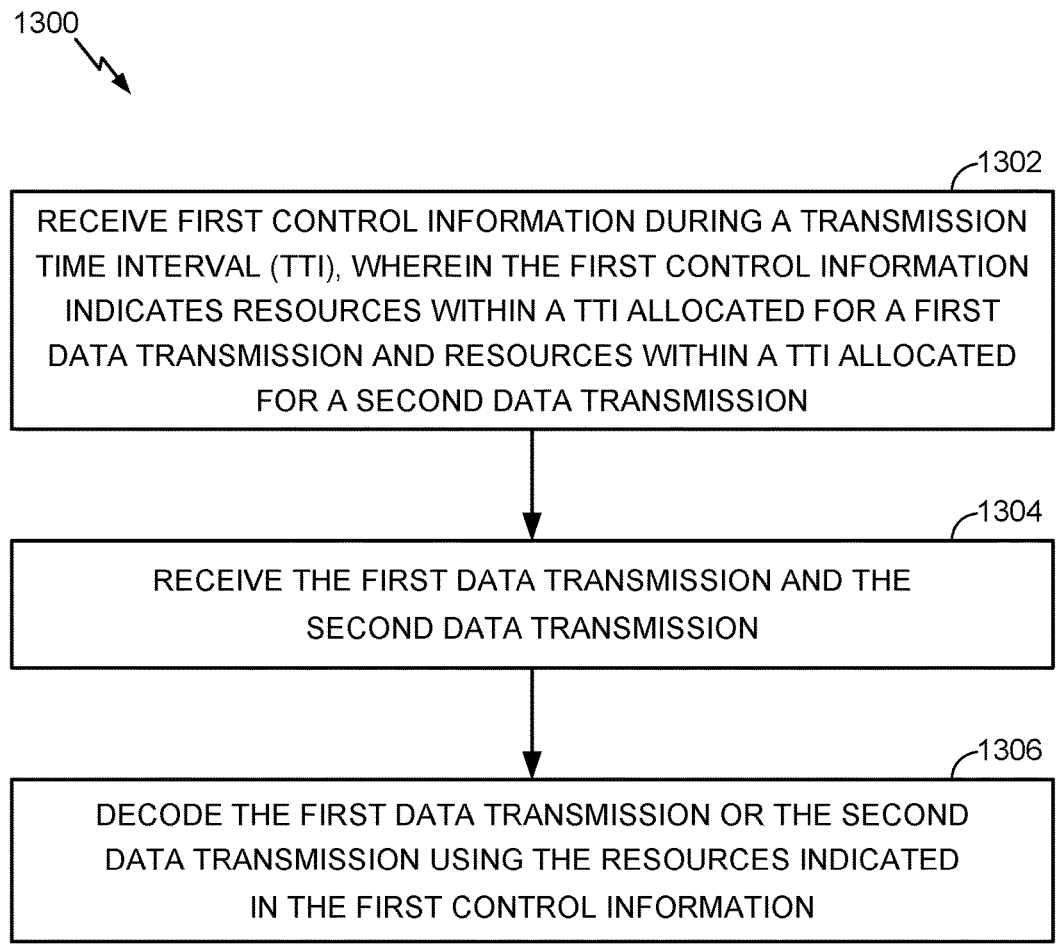
FIG. 13 illustrates example operations for receiving control information indicating resources allocated for a plurality of data transmissions, in accordance with aspects of the present disclosure.
Figure 14:
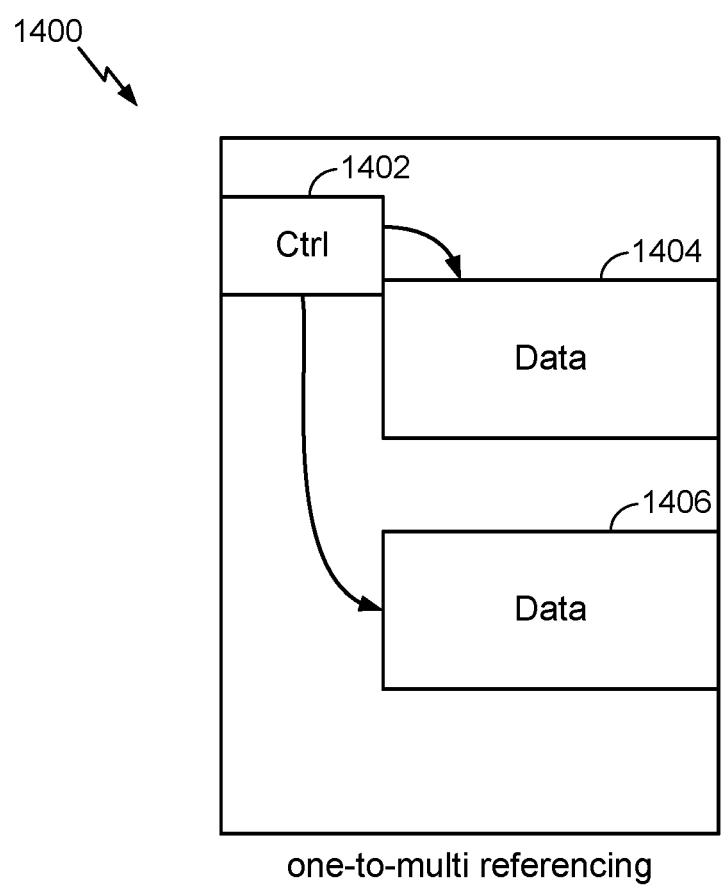
FIG. 14 illustrates an example control information resource block indicating resources allocated for a plurality of data transmissions, in accordance with aspects of the present disclosure.

In some cases, a control information resource block may indicate resources allocated for multiple data transmissions, as described in greater detail with respect to FIGS. 12-14.

FIG. 12 illustrates example operations 1200 for wireless communication, in accordance with aspects of the present disclosure. The operations 1200 may be performed, for example, by a transmitter such as eNodeB 310 or user equipment 350.

The operations 1200 may optionally begin, at 1202, by transmitting first control information during a transmission time interval (TTI), wherein the first control information indicates resources within a TTI allocated for a first data transmission and resources within a TTI allocated for a second data transmission. The operations 1200 continue, at 1204, by transmitting the first data transmission and the second data transmission using the resources indicated in the first control information.

FIG. 13 illustrates example operations 1300 for wireless communication, in accordance with aspects of the present disclosure. The operations 1300 may be performed, for example, by a receiver such as eNodeB 310 or user equipment 350.

The operations 1300 may begin, at 1302, by receiving first control information during a transmission time interval (TTI), wherein the first control information indicates resources within a TTI allocated for a first data transmission and resources within a TTI allocated for a second data transmission. The operations 1300 continue at 1304 by receiving the first data transmission and the second data transmission, and at 1306 by decoding the first data transmission or the second data transmission using the resources indicated in the first control information.

The operations of FIGS. 12 and 13 may be described with reference to FIG. 14, which illustrate an example of transmitting control information that indicates resources for multiple instances of (possibly the same) data.

FIG. 14 illustrates a signal 1400 that includes a control information resource block 1402 that indicates resources allocated for multiple data transmissions 1404, 1406, according to certain aspects of the present disclosure. In certain aspects, a transmitter may transmit the signal 1400 including the control information 1402 and data transmissions 1404, 1406.

In certain aspects, at least two of the control information 1402 and data transmissions 1404, 1406 may be transmitted in a same TTI. The signal 1400 may be received by a receiver (e.g., user equipment 350) which may use the control information 1402 (e.g., the indication of resources) to decode at least one of the data transmissions 1404, 1406. In certain aspects, data 1406 may be a repetition of data 1404, allowing a receiver to combine the data transmissions for decoding to increase reliability.

In certain aspects, the data transmissions 1404 and 1406 may be transmitted on different component carriers. For example, the data transmission 1404 may be transmitted on a first component carrier, and data transmission 1406 may be transmitted on a second component carrier. In some cases, the control information 1402 may be transmitted on either the first or second component carrier with the first or second data transmissions 1404, 1406, respectively. In other cases, the control information 1402 may be transmitted on a third component carrier. In certain aspects, at least one of the data transmissions 1404 and 1406 may be transmitted during a different TTI than the control information 1402.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    transmitting first control information during a first transmission time interval (TTI), wherein the first control information indicates resources within a TTI allocated for a data transmission, wherein the first control information further indicates other resources within the first TTI allocated for another data transmission;
    transmitting the data using the indicated resources;
    transmitting second control information during the first TTI, wherein the second control information also indicates the resources for the data transmission, wherein the second control information further indicates the other resources within the first TTI allocated for the other data transmission; and
    transmitting the other data using the other indicated resources.

2. The method of claim 1, wherein:
    the first control information is transmitted on a first component carrier (CC); and
    the second control information is transmitted on a second CC.

3. The method of claim 1, further comprising:
    determining whether an acknowledgement or negative-acknowledgement (ACK/NACK) has been received corresponding to the data transmission, wherein transmitting the second control information is based on the determination.

4. The method of claim 1, further comprising determining whether to activate a cross referencing mode of operation, wherein transmitting the second control information comprises transmitting the second control information if the cross referencing mode of operation is activated.

5. The method of claim 4, further comprising transmitting an indication that the cross referencing mode of operation has been activated, based on the determination.

6. A method for wireless communication, comprising:
    receiving a signal, during a first transmission time interval (TTI), wherein the signal, as transmitted by an apparatus, comprises a first control information, wherein the first control information indicates resources within a TTI for a data transmission, wherein the first control information further indicates resources within the first TTI allocated for another data transmission;
    storing the received signal;
    receiving second control information during the first TTI, wherein the second control information also indicates the resources for the data transmission, wherein the second control information further indicates resources within the first TTI allocated for the other data transmission;
    decoding the data transmission based on the resources indicated in the second control information; and
    decoding the other data transmission based on the indicated resources for the other data transmission.

7. The method of claim 6, wherein:
    the first control information is received on a first component carrier (CC), and
    the second control information is received on a second CC.

8. The method of claim 6, further comprising:
    receiving an indication that a cross referencing mode of operation has been activated, wherein storing the received signal comprises storing the received signal if the cross referencing mode of operation has been activated.

9. An apparatus for wireless communication, comprising:
    at least one antenna;
    a processing system configured to:
        transmit, via the at least one antenna, first control information during a first transmission time interval (TTI), wherein the first control information indicates resources within a TTI allocated for a data transmission, wherein the first control information further indicates other resources within the first TTI allocated for another data transmission;
        transmit, via the at least one antenna, the data using the indicated resources;
        transmit, via the at least one antenna, second control information during the first TTI, wherein the second control information also indicates the resources for the data transmission, wherein the second control information further indicates the other resources within the first TTI allocated for the other data transmission; and transmit, via the at least one antenna, the other data using the other indicated resources.

10. The apparatus of claim 9, wherein:
the TTI allocated for the data transmission comprises a second TTI that is before the first TTI.

11. The apparatus of claim 9, wherein:
the first control information is transmitted on a first component carrier (CC); and
the second control information is transmitted on a second CC.

12. The apparatus of claim 9, wherein the processing system is further configured to:
determine whether an acknowledgement or negative-acknowledgement (ACK/NACK) has been received corresponding to the data transmission, wherein transmitting the second control information is based on the determination.

13. The apparatus of claim 9, wherein the processing system is further configured to determine whether to activate a cross referencing mode of operation, wherein transmitting the second control information comprises transmitting the second control information if the cross referencing mode of operation is activated.

14. The apparatus of claim 13, wherein the processing system is further configured to transmit, via the at least one antenna, an indication that the cross referencing mode of operation has been activated, based on the determination.

15. An apparatus for wireless communication, comprising:
a memory;
a processing system configured to:
receive a signal, during a first transmission time interval (TTI), wherein the signal, as transmitted by an apparatus, comprises a first control information, wherein the first control information indicates resources within a TTI for a data transmission, wherein the first control information further indicates resources within the first TTI allocated for another data transmission;
store the received signal in the memory;
receive second control information during the first TTI, wherein the second control information also indicates the resources for the data transmission, wherein the second control information further indicates resources within the first TTI allocated for the other data transmission;
decode the data transmission based on the resources indicated in the second control information; and
decode the other data transmission based on the indicated resources for the other data transmission.

16. The apparatus of claim 15, wherein:
the TTI allocated for the data transmission comprises a second TTI that is before the first TTI.

17. The apparatus of claim 16, wherein the data transmission is a retransmission of the other data transmission, and wherein decoding the data transmission and decoding the other data transmission comprises combining the data transmission and the other data transmission.

18. The apparatus of claim 15, wherein:
the first control information is received on a first component carrier (CC), and
the second control information is received on a second CC.

19. The apparatus of claim 15, wherein the processing system is further configured to:
receive an indication that a cross referencing mode of operation has been activated, wherein storing the received signal comprises storing the received signal if the cross referencing mode of operation has been activated.

20. The method of claim 1, wherein:
the TTI allocated for the data transmission comprises a second TTI that is before the first TTI.

21. The method of claim 6, wherein:
the TTI allocated for the data transmission comprises a second TTI that is before the first TTI.

22. The method of claim 21, wherein the data transmission is a retransmission of the other data transmission, and wherein decoding the data transmission and decoding the other data transmission comprises combining the data transmission and the other data transmission.

* * * * *